(12) United States Patent
Meliksetian et al.

(10) Patent No.: US 7,284,012 B2
(45) Date of Patent: Oct. 16, 2007

(54) MULTIPLE ATTRIBUTE OBJECT COMPARISON BASED ON QUANTITATIVE DISTANCE MEASUREMENT

(75) Inventors: Dikran S. Meliksetian, Danbury, CT (US); Nianjun Zhou, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 722 days.

(21) Appl. No.: 10/350,951

(22) Filed: Jan. 24, 2003

(65) Prior Publication Data

US 2004/0148312 A1 Jul. 29, 2004

(51) Int. Cl.
*G06F 7/00* (2006.01)
*G06F 17/00* (2006.01)
*G05B 13/02* (2006.01)
*G06N 7/04* (2006.01)
*G10L 15/00* (2006.01)
*G10L 15/06* (2006.01)

(52) U.S. Cl. ............ 707/103 R; 700/50; 706/54; 704/245; 704/239

(58) Field of Classification Search ............ 700/50; 706/900, 54; 704/245, 239
See application file for complete search history.

(56) References Cited

U.S. PATENT DOCUMENTS

| | | | |
|---|---|---|---|
| 4,905,162 A * | 2/1990 | Hartzband et al. ............ 706/52 |
| 5,461,698 A * | 10/1995 | Schwanke et al. ............ 706/20 |
| 5,491,643 A | 2/1996 | Batchelder ................. 703/1 |
| 5,751,286 A * | 5/1998 | Barber et al. ................ 715/835 |
| 6,226,589 B1 | 5/2001 | Maeda et al. ................ 701/207 |
| 6,236,836 B1 | 5/2001 | Westman et al. ............ 340/7.1 |
| 6,529,892 B1 * | 3/2003 | Lambert ..................... 706/55 |

FOREIGN PATENT DOCUMENTS

JP  2000357233 A  2/2001

OTHER PUBLICATIONS

A.E. Bernal et al, 'Similarity Based Classification', Sep. 2003, Springer Berlin/Heidelberg, vol. 2810/2003, pp. 187-197.*
Bosc, P. and Irisa, M. Galibourg, "Flexible Selection Among Objects: A Framework Based on Fuzzy Sets," ACM, 0-89791-274-8, 1988, pp. 433-449.
Gapp, K.P., "Object Localization: Selection of Optimal Reference Objects," International Conference COSIT '95, pp. 519-536, Berlin, Germany, 1995. (Abstract Only).

* cited by examiner

*Primary Examiner*—Don Wong
*Assistant Examiner*—Cheryl M Shechtman
(74) *Attorney, Agent, or Firm*—John E. Campbell; Jose Gutman; Fleit Kain Gibbons Gutman Bongini & Bianco P.L.

(57) ABSTRACT

A system selects a plurality of attributes common to objects being compared and defines at least one value space for each selected attribute. Each selected attribute can have a value space that is different from a value space of the same attribute associated with a different object. The system defines an ordering system for each value space including selecting whether the value space consists of non-ordered values, partially ordered values, or fully ordered values. An objective function is defined for each ordering system and the objective function maps a pair of values of a value space to a number value. The system normalizes each objective function and defines a mapping from the plurality of objective functions to a first general objective function.

18 Claims, 7 Drawing Sheets

MULTIPLE ATTRIBUTE OBJECT COMPARISON BASED ON QUANTITATIVE DISTANCE MEASUREMENT

FIELD OF THE INVENTION

This invention generally relates to the field of object repositories and more specifically to comparison of objects in object repositories.

DESCRIPTION OF RELATED ART

One of the major challenges in the knowledge management area is to compare different objects in an object-oriented system. Objects are often characterized with a variety of attributes and those attributes may have different value spaces. For example, the value space of an "age" attribute is an integer, while the "color" attribute can be a limited set of possible colors. The problem is how to assess and relate these inherently incomparable attributes to compare the objects themselves. Thus, the creation of a metric system is necessary for comparing objects of different types. Such a metric system can help users find other objects given a sample object, based on the similarities, or distances, between the objects.

In one example, a real estate database stores an object for every home that is on the market. A homebuyer usually has multiple constraints and objectives that need to be satisfied for the selection of a house. This includes the number of bedrooms, the number of bathrooms, distance from work, etc. But these requirements/conditions may conflict each other. For example the requirement of a ranch style home and a requirement that the home is within a few miles of a certain city. In addition, there are a myriad of attributes that are associated with any particular home that the user may or may not want to specify. However, the user may not know which attributes should be specified in order to perform a search. Therefore, it can be difficult to define a search query.

In another example, a human resources database stores an object for every job candidate and an object for every open position. In the human resources management area, there is a need to match job candidates with open positions. Preferably, a search algorithm should return an ordered list of job candidates based on the candidate's fitness for an open position. However, the problem lies with defining the manner in which the candidate objects are compared to position objects. The attributes of candidate objects are different from attributes of position objects, though some may be similar. Thus, it is unclear in what manner to compare candidate objects with position objects in light of the difference in attributes. Other variants of the same application domain would be the problem of finding job openings similar to a given job opening or a set of candidates similar to a selected candidate.

Therefore a need exists to overcome the problems with the prior art as discussed above, and particularly for a way to more efficiently seek and compare objects in an object database.

SUMMARY OF THE INVENTION

Briefly, in accordance with the present invention, disclosed is a system, method and computer readable medium for comparing objects, each object having multiple attributes. According to a preferred embodiment of the present invention, a method in an information processing system includes selecting a plurality of attributes common to objects being compared and defining at least one value space. At least one value space is defined for each attribute of the plurality of attributes selected. The method further includes defining a plurality of ordering systems. An ordering system is defined for each value space of the at least one value space. The method further includes defining a plurality of objective functions. An objective function is defined for each ordering system of the plurality of ordering systems and wherein an objective function maps a pair of values of a value space to a number value. The method further includes normalizing each objective function of the plurality of objective functions and defining a mapping from the plurality of objective functions to a first objective function. A result of the execution of the mapping is a distance value representing a comparison between objects.

In another embodiment of the present invention, the method further includes selecting a first object and a second object and executing the mapping using the attributes' of the first object and the second object. The distance value generated from the execution of the mapping represents a comparison of the first object and the second object.

In another embodiment of the present invention, the method further includes defining a similarity value n representing a comparison between two objects, wherein the similarity value n is defined as:

$$n = 1 - d^2/(d^2+1)$$

The preferred embodiments of the present invention are advantageous as they allow for the comparison of objects having different attributes and different value spaces for attributes. This allows for great compatibility and applicability of object search and comparison algorithms to wider range of objects and object databases. In addition, the preferred embodiments of the present invention are advantageous as they allow for calculation of similarity values between compared objects. This is beneficial as it allows for the search and identification of a subset of objects that meet similarity criteria, as opposed to matching criteria.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DESCRIPTION OF THE PREFERRED EMBODIMENTS

I. Overview

The present invention, according to a preferred embodiment, overcomes problems with the prior art by providing an efficient and easy-to-implement method for finding and comparing objects in an object database.

Figure 1A:
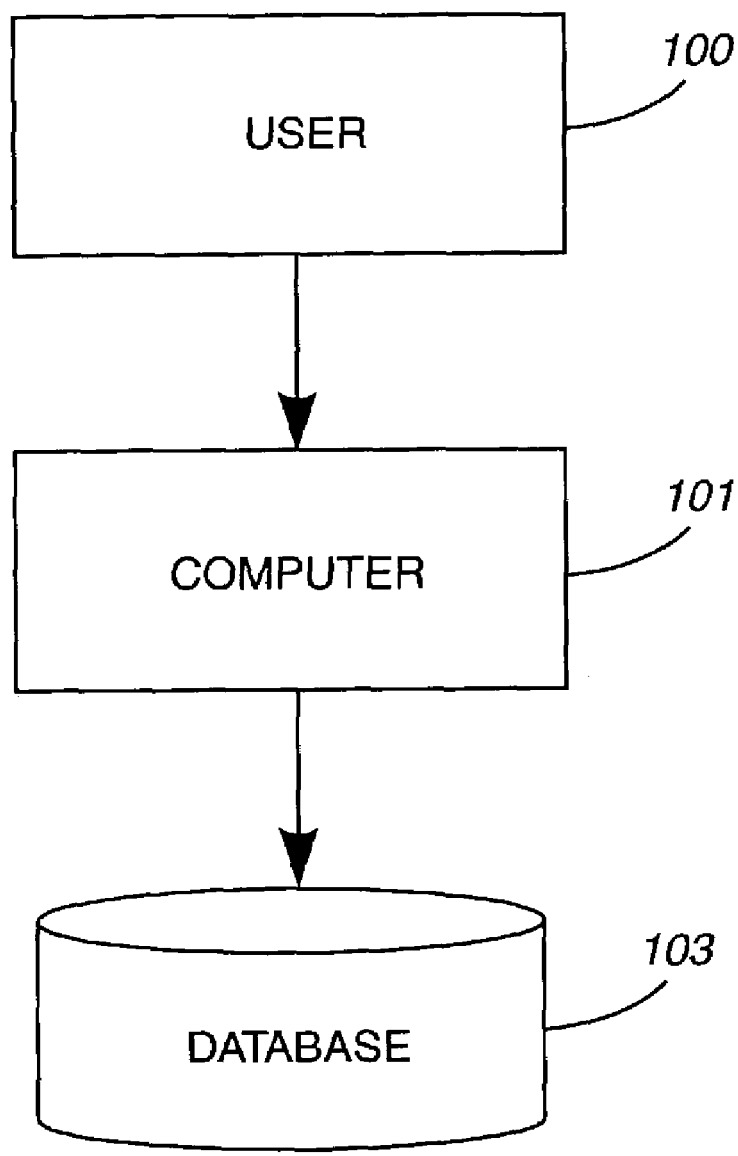
FIG. 1A is a block diagram illustrating an overall system according to a preferred embodiment of the present invention.

FIG. 1A is a block diagram illustrating an overall system architecture according to a preferred embodiment of the present invention. A user 100, operating on a client information processing system or a client computer 101 utilizes a client application, such as a database management system (DBMS), on the client computer 101 to interact with the database 103.

In a preferred embodiment of the present invention, the computer system of computer 101 comprises one or more Personal Computers (PCs) (e.g., IBM or compatible PC workstations running the Microsoft Windows 95/98/2000/ME/CE/NT/XP operating system, Macintosh computers running the Mac OS operating system, or equivalent), Personal Digital Assistants (PDAs), game consoles or any other information processing devices. In another preferred embodiment, the computer system of computer 101 comprises a server system (e.g., SUN Ultra workstations running the SunOS operating system or IBM RS/6000 workstations and servers running the AIX operating system).

In another preferred embodiment of the present invention, the database 103 is a part of the computer system of computer 101. In yet another preferred embodiment of the present invention, the database 103 is a part of a computer system (such as a server system) separate from computer 101 (a client system). In the present exemplary embodiment, the computer 101 communicates with the computer system of database 103 over a network or other communication medium.

In yet another preferred embodiment of the present invention, an optional network connects computer 101 and database 103. In one embodiment, the network comprises a circuit switched network, such as the Public Service Telephone Network (PSTN). In another embodiment, the network comprises a packet switched network. The packet switched network is a wide area network (WAN), such as the global Internet, a private WAN, a local area network (LAN), a telecommunications network or any combination of the above-mentioned networks. In yet another embodiment, the network comprises a wired network, a wireless network, a broadcast network or a point-to-point network.

In an exemplary embodiment where the database 103 is a part of a server computer system separate from client computer 101, certain tasks at client computer 101 are performed by a client application, such as a Java applet, a Java scriptlet, Java script, Perl script, an Active X control or any self-sufficient application executing on the computer system of computer 101. Further, certain tasks at the server system of database 103 are performed by a server application such as a Common Gateway Interface (CGI) script, a Java servlet, a Hypertext Preprocessor (PHP) script, a. Perl script or any self-sufficient application executing on the server system of database 103.

Figure 1B:
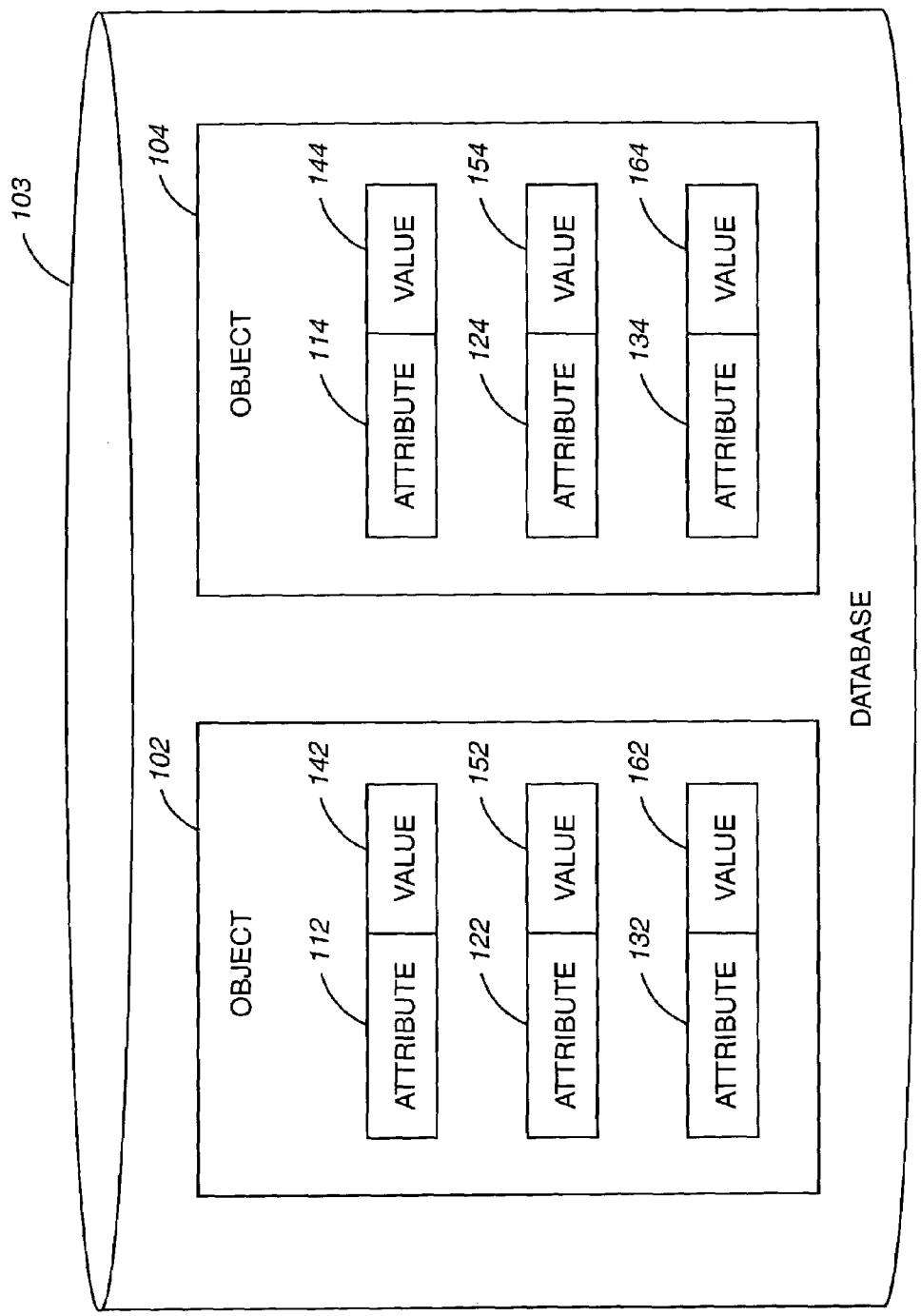
FIG. 1B is a block diagram illustrating database objects and attributes according to a preferred embodiment of the present invention.

FIG. 1B is a block diagram illustrating database objects and attributes according to a preferred embodiment of the present invention. FIG. 1B shows the database 103 of FIG. 1A, which database stores multiple objects. FIG. 1B shows objects 102 and 104 in object database. Note that although only two exemplary objects are depicted in FIG. 1B, the database 103 supports the storage of any number of objects. FIG. 1B also shows that each object includes multiple attributes. Object 102 includes attributes 112, 122 and 132. Object 104 includes attributes 114, 124 and 134. Note that although only three attributes are depicted in the exemplary objects of FIG. 1B, the objects of database 103 support the storage of any number of attributes. Note also, that although every attribute in FIG. 1B is labeled differently, some of the attributes might represent the same concept.

An attribute may comprise a quality, property, or characteristic, of an object. For example, if database 103 were a database of job candidates and each object in database 103 represented information associated with a candidate, then an attribute would be a level of education (secondary school through graduate degree) or number of years working. In another example, if database 103 were a real estate database of homes for sale and each object in database 103 represented information associated with a home, then an attribute would be the number of bedrooms or the number of bathrooms.

Further, FIG. 1B shows that each attribute is associated with a value. Attribute 112 with value 142, attribute 122 with value 152, attribute 132 with value 162, attribute 114 with value 144, attribute 124 with value 154, and attribute 134 with value 164.

Figure 1C:
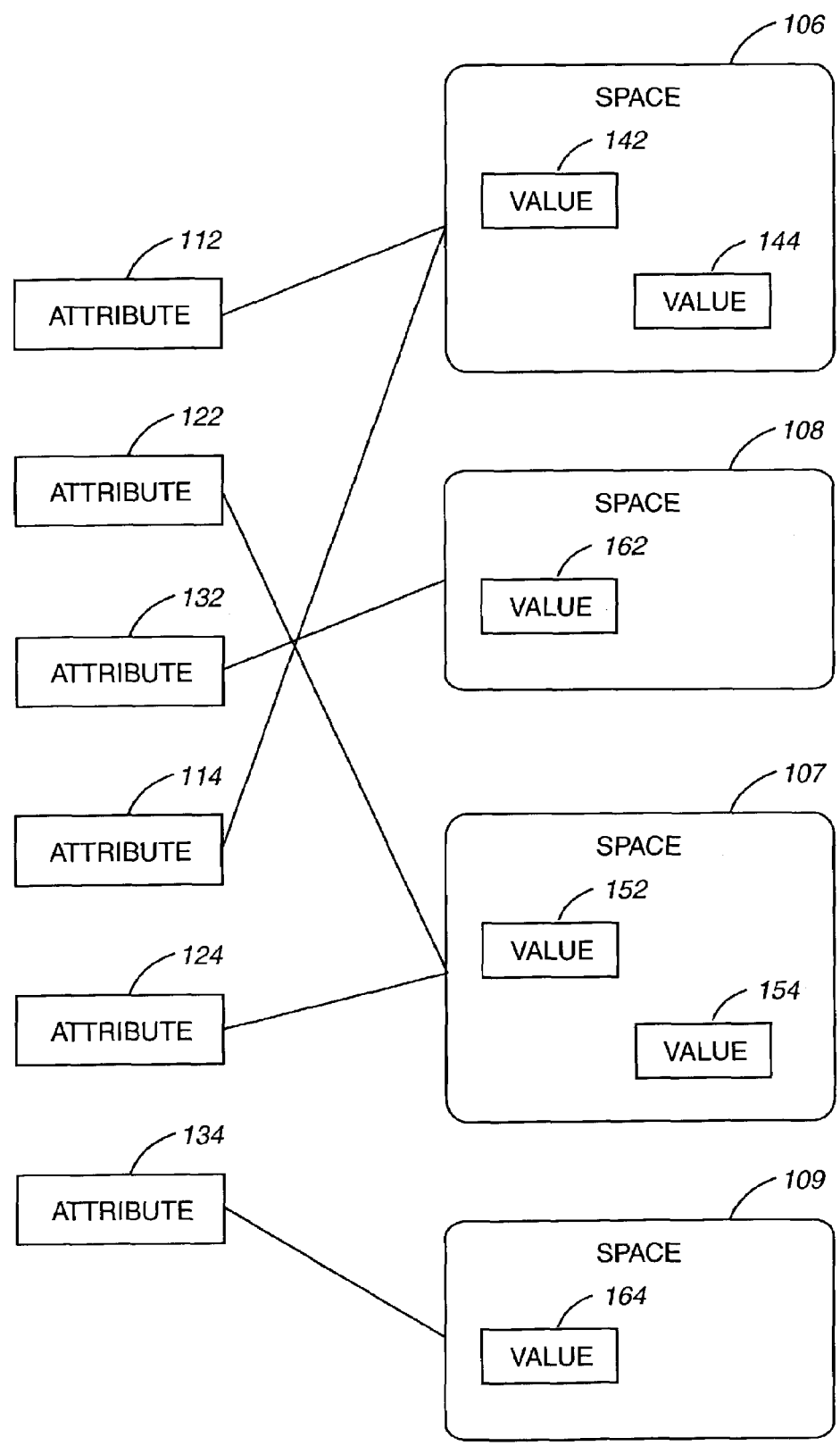
FIG. 1C is a block diagram illustrating meta data about object attributes according to a preferred embodiment of the present invention.

FIG. 1C is a block diagram illustrating meta data about object attributes according to a preferred embodiment of the present invention. For each attribute, the system stores information about the corresponding attribute value space, or value space for short. The value space specifies properties, characteristics and interrelationships that the values of the specified attribute can take. It specifies among other characteristics: 1) the type of the values; for example, strings of ASCII characters or 16 bit integers; 2) the ordering system of the values, i.e., whether the space is fully ordered like a linear space or has a more complex structure and supports only a partial order; 3) the range within the space that the values can span; 4) the cardinality of the value space, which can be limited or unlimited. The identification of the characteristics of the value space is important to determine the suitable objective function (see step 310 in the FIG. 2) for the attribute. FIG. 1C shows that attributes 112 and 114 share the same space 106 that contains the values 142 and 144. Attributes 122 and 124 share the same space 107 that contains the values 152 and 154, while attributes 132 and 134 each have a separate space associated with them. The identification of a common value space for attributes of different objects is useful in determining which attributes of objects are used to determine the distance or similarities between objects of different types.

II. An Object Search And Comparison System

Figure 2:
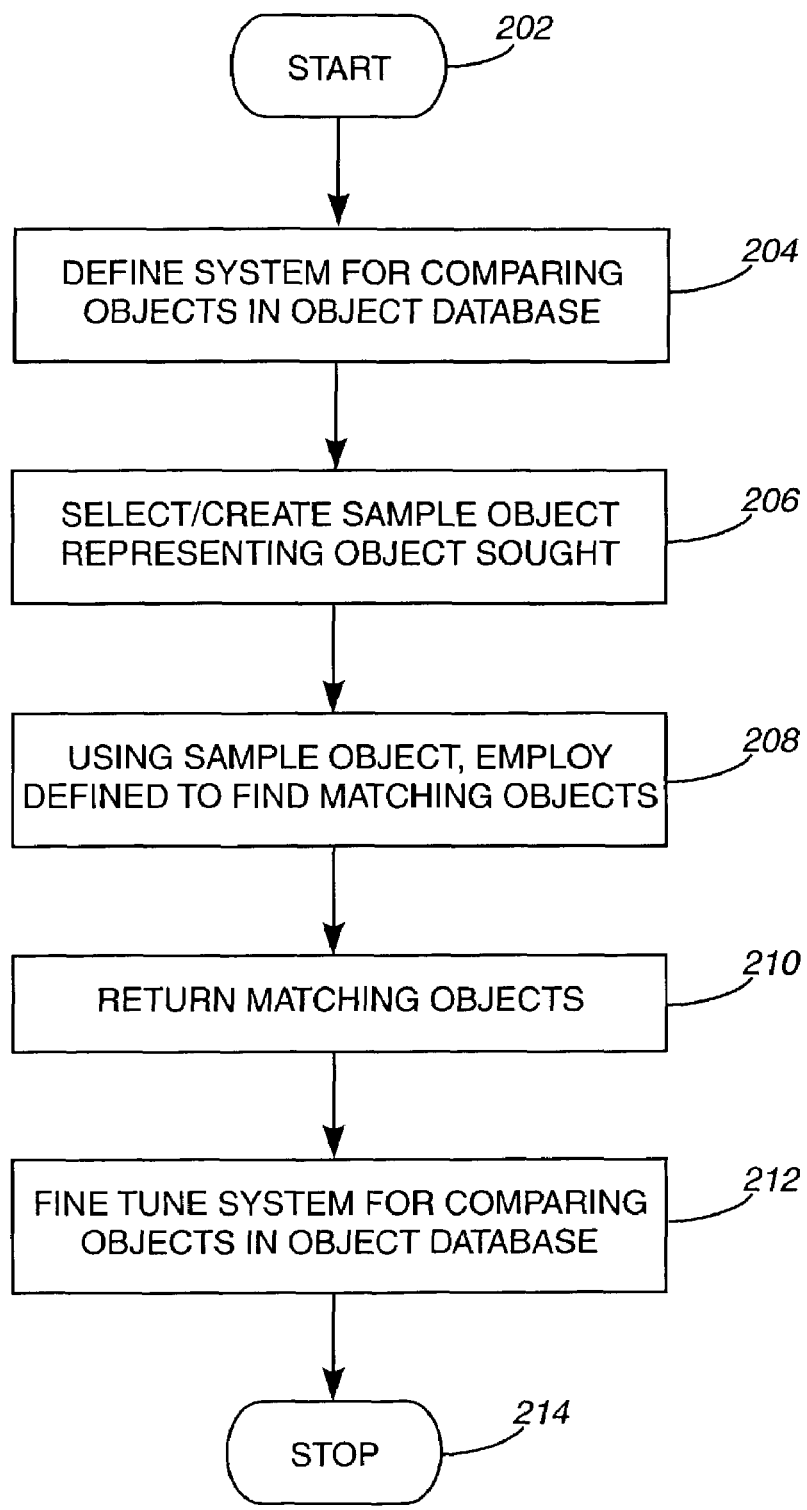
FIG. 2 is a flowchart depicting the operation and control flow of an overall process according to a preferred embodiment of the present invention.

FIG. 2 is a flowchart depicting the operation and control flow of an overall process according to a preferred embodiment of the present invention. The flowchart of FIG. 2 shows the overall process of defining and implementing an object search and comparison system. The control flow of FIG. 2 begins with step 202 and flows directly to step 204. In step 204, a system for searching and comparing objects in a database is defined. The process of step 204 is described in greater detail below, with regards to FIG. 3.

In step 206, a sample object, representing the object that is sought, is created or selected. In the example of a real estate database, a home representing the type of home that is desired by a user is selected. Based on the sample home, the system of the present invention proceeds to find a home that is identical to or similar to the sample home. Alternatively, a home representing the type of home that is desired by a user is generated. That is, an object representing the type of home that is desired by a user is generated and selected. Based on the sample home generated, the system of the present invention proceeds to find a home that is identical to or similar to the sample home.

In step 208, the sample object is used by the defined object search and comparison system to find matching objects. The method employed for comparing two objects is defined in greater detail with reference to FIG. 3 below. The comparison method described below is executed for the sample object and other objects in the database 103. That is, the sample object is compared to other objects in database 103 using the described comparison method. Based on the result of the comparisons, in step 210, the system, according to a preferred embodiment of the present invention, returns those objects that met the matching criteria. If the matching criteria involved similarity comparisons, the system returns an ordered list of those objects that were similar to the matching criteria.

In step 212, the system is fine-tuned based on the results of steps 208 and 210 above. Step 212 may involve the selection of a different sample object, as described in step 206 above. Alternatively, step 212 may involve modification of 1) selected attributes for comparison (described in step 304 below, with reference to FIG. 3), 2) the defined value space for each attribute (step 306), 3) the defined ordering system for each value space (step 308), 4) the defined objective function for each ordering system (step 310), 5) the defined general objective function (step 314) and 6) the defined similarity function (step 316).

In step 214, the control flow of FIG. 2 ceases.

Figure 3:
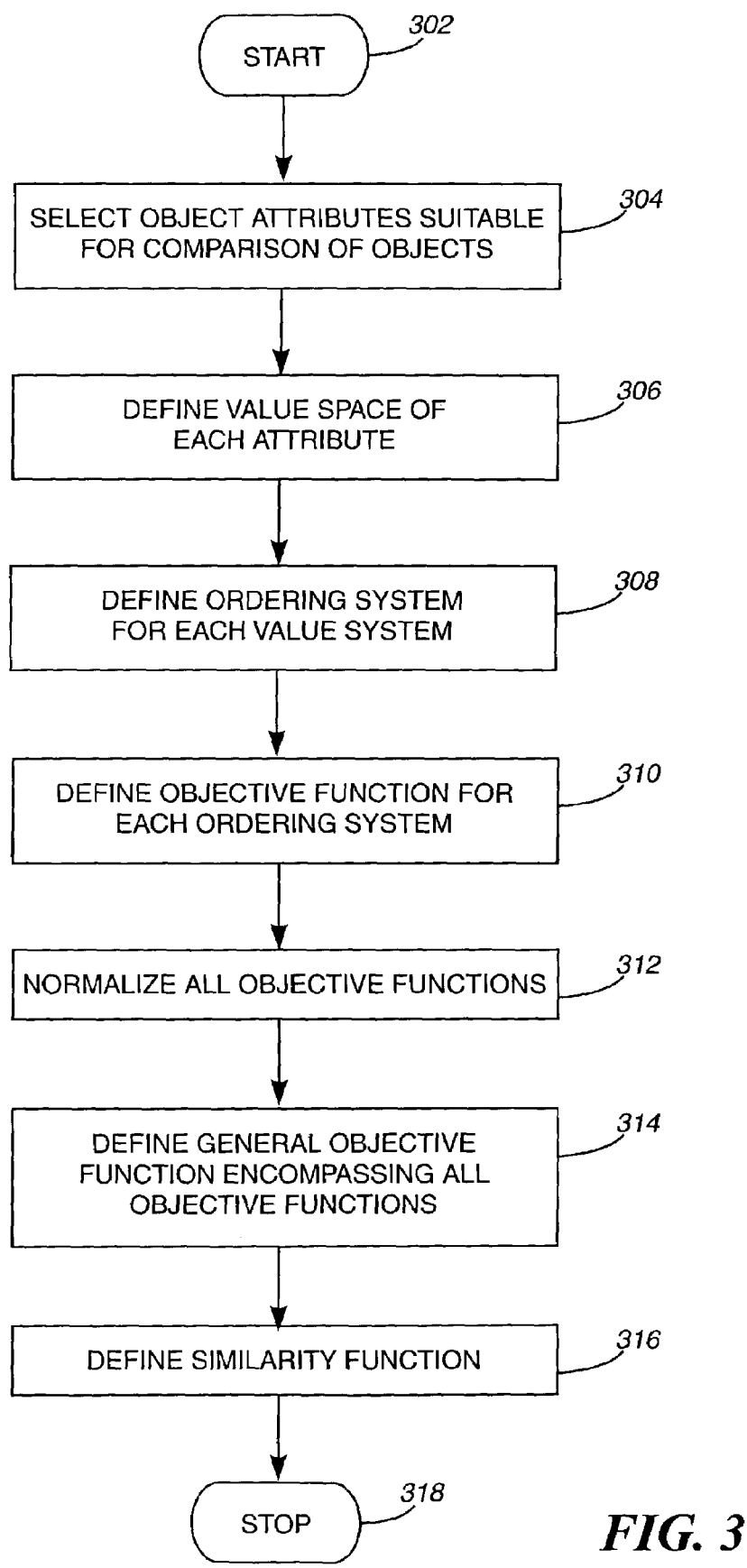
FIG. 3 is a flowchart depicting the operation and control flow of the process of defining an object comparison system, according to a preferred embodiment of the present invention.

FIG. 3 is a flowchart depicting an exemplary operation and control flow of a process of defining an object comparison system, according to a preferred embodiment of the present invention. FIG. 3 provides more detail regarding defining an exemplary system for searching and comparing objects in a database, as shown in step 204 of FIG. 2 above. FIG. 3 begins with step 302 and proceeds directly to step 304.

In step 304, a representative set of attributes, associated with the objects in the database 103, are selected. The attributes are selected so as to capture information that is important for searching and comparing objects. The selection of too many attributes can confuse the search and comparison processes. Likewise, the selection of too few attributes may result in the overlooking of important information. Thus, it is preferred that an appropriate number of attributes are selected. Preferably, the selection of attributes is conducted by a person or computer having knowledge of the domain of the objects.

For example, in the real estate database scenario, attributes such as number of bedrooms, number of bathrooms and asking price are important and should be selected. The aforementioned attributes are typically those attributes that are scrutinized by potential buyers of homes. However, attributes such as color of the home and type of lighting in the home are not important and should not be selected. Potential buyers of homes do not typically scrutinize the aforementioned attributes.

In step 306, a value space is defined for each attribute. A value space defines the type of values that might be associated with an attribute. Furthermore, within the value space, a value range prescribes a range of values that may be associated with an attribute. The cardinality of a value range can be limited or unlimited. Examples of a value range are: an ASCII or Unicode String, a real number, an integer and a natural number (zero and positive integers).

In step 308, an ordering system is defined for each value space. An ordering system defines an order that is associated with each value in a value space. For example, the ordering system of the set of positive integers is standard numerical order. The number 1 is followed by the number 2, which is followed by the number 3, etc. In another example, the ordering system of the set of English letters (i.e., the alphabet) is standard alphabetical order. The letter A is followed by the letter B, which is followed by the letter C, etc.

There are various types of ordering systems. In a non-ordered ordering system, two values from a value space are either equal or not equal. In such an ordering system, there is no concept of similarity or ordering. In a fully ordered ordering system, any two values from the value space can be compared and ordered. As such, values can be equal to each other, unequal to each other or similar to each other (based on their ordering). In a partially ordered ordering system, subsets of the values in the value space are ordered. Thus, two values from a value space can be either ordered or not, depending on the values selected. As such, values can be equal to each other, unequal to each other or similar to each other (based on their ordering, if available). A partially ordered value space can be represented by a forest mathematically using graph theory.

In an example where a value space is a string type (i.e., a string of alphanumeric characters), a fully ordered ordering system can be defined for the value space, wherein alphabetic order is used to order all values in the value space. Alternatively, a partially ordered ordering system can be defined for the value space, wherein string operations such as "contain" and "start with" are used to order some of the values in the value space. Alternatively, a non-ordered ordering system can be defined for the value space, wherein a string represents a name or a color. In this ordering system, values are either equal or not. There is no concept of ordering values.

In an example where a value space is a number type (i.e., any real or integer number), a fully ordered ordering system can be defined for the value space, wherein numeric order is used to order all values in the value space.

In step 310, an objective function is defined for each ordering system. An objective function f is defined as a mapping of two values from the ordering system to a single non-negative number. Mathematically, an objective function is a map between a pair of values from the value space and a non-negative real number. In practice, the objective function defines a difference, or a distance, between two values in a value space.

The mapping of the objective function is not necessarily symmetrical. Therefore, it is possible that the mapped value f(a, b) of pair (a, b) is not the same as the mapped value f(b, a) of pair (b, a). Furthermore, an objective function f for a given ordering system O over a value space V must have the following properties:

$\forall a \in V f(a,a)=0$ $\forall a,b,c \in V$ if $a \leq b$ and $b \leq c$, then $f(a,b) \leq f(a,c)$ and $f(b,c) \leq f(a,c)$ In short, the properties above assert that if a, b, c are a given ordered set of values, then the difference between a and c is greater than both the difference between a and b and the difference between b and c. For example, if the values a, b, c were numbers given in rising order, then it would be clear that the difference between a and c is greater than both the difference between a and b and the difference between b and c. The concept of an objective function is described in greater detail in FIG. 4 below.

In an example where the database 103 is a real estate database (as described above), an objective function maps pairs of values in a value space of an attribute to a single non-negative value. For example, an objective function could map: 1) the desired number of bathrooms and the actual number of bathrooms, 2) the desired number of bedrooms and the actual number of bedrooms 3) the driving distance between the house and the buyer's workplace and the desired driving distance, 4) the predicted school and property taxes and the desired school and property taxes and 4) the distance from the house to business centers and the desired distance.

In an example where an objective function f maps a desired number (such as a desired number of bathrooms) and an actual number (such as an actual number of bathrooms), the objective function f may be implemented as a penalty function wherein the resultant value of the objective function (i.e., the domain of f) indicates the magnitude with which the actual number differs from the desired number. An example of such an objective function is:

$1 \leq m < n\ f(m,n)=(n-m)^{10}$ $m \geq n\ f(m,n)=(m-n)^{0.5}$ $m=n\ f(m,n)=0$ where n is the desired number (of bathrooms, for example) and m is the actual number. The objective function f above shows that as the resultant value of f increases, the penalty also increases. For m=n there is no penalty as the resultant value is zero. The objective function f above also shows that the penalty increases quicker for m<n than for m>n. This is desirable as a potential buyer would more likely be more interested in a home that possesses more bathrooms than desired, as opposed to a home that possesses less bathrooms than desired.

In step 312, each objective function is normalized. Normalization involves modifying the objective functions to conform to a standard. Specifically, each objective function is modified to map to a value between 0 and 1. This allows for the direct comparison of resultant values from different objective functions. In one example, an unbounded function f can be normalized by subjecting it to the following transformation:

$f'=f^2/(f^2+1)$ wherein the function f' represents the normalized objective function f. The equation above shows that all the domain of f' lies between zero and one. Specifically, as the value of f approaches infinity, the resultant value of f' approaches one. Conversely, as the value of f approaches zero, the resultant value of f' approaches zero.

In another example, a bounded function f, which values ranging from 0 to D (i.e., $0 \leq f \leq D$), can be normalized by subjecting it to the following transformation:

$f'=f/D$ where $0 \leq f \leq D$ wherein the function f' represents the normalized objective function f. The equation above shows that the domain of f' lies between zero and one. Specifically, as the value of f approaches D, the resultant value of f' approaches one. Conversely, as the value of f approaches zero, the resultant value of f' approaches zero.

In step 314, all objective functions are mapped to a single objective function, called a general objective function. As each objective function defines a difference, or distance, between two values in a value space, the general objective function defines a difference, or distance, between two objects (as it encompasses the distance values of each value space of each attribute of the objects being compared). The resulting distance value of the general objective function is defined as a mapping from the set of multi-dimensional objective functions into one general objective function.

The result of the mapping of the general objective function is a non-negative value. In addition, the general objective function is a convex function. A convex function is a function whose value at the midpoint of every interval in its domain does not exceed the average of its values at the ends of the interval. Therefore, the general objective function $f_G$ is defined as:

$d=f_G(f_1, f_2, \ldots, f_n)$ where $f_1, f_2, \ldots, f_n$ represents the plurality of objective functions for each of a plurality of attributes and where d is a distance value representing a comparison between objects. Because the general objective function defines a multi-dimensional distance between two objects, the general objective function is also referred to as a distance function.

In one example, the general objective function is defined as the linear combination of each individual objective function where the weight factor of each objective function is a positive number. For example:

$d=\alpha_1 f_1 + \alpha_2 f_2 + \ldots + \alpha_n f_n$ where $f_1, f_2, \ldots, f_n$ represents the plurality of objective functions for each of a plurality of attributes, where d is a distance value representing a comparison between objects and where:

$\alpha_1, \alpha_2, \ldots \alpha_n \geq 0$ and $\alpha_1+\alpha_2+\ldots+\alpha_n=1$.

In another example, the general objective function is defined as the conventional definition of distance in physical (albeit multi-dimensional) space. For example:

$d=f_1^2+f_2^2+\ldots+f_n^2$ where $f_1, f_2, \ldots, f_n$ represents the plurality of objective functions for each of a plurality of attributes and where d is a distance value representing a comparison between objects.

In one embodiment of the present invention, general objective function is defined for the comparison of objects that may not share the same objective functions $f_1, f_2, \ldots, f_n$ (because they do not share the same attributes). In this case, the distance value d is calculated over a partial distance because the two objects being compared do not share the same attributes. Therefore, in this embodiment, the general objective function $f_G$ is defined as:

$$d = f_G(f_1, f_2, \ldots, f_n)$$

where $f_1, f_2, \ldots, f_n$ represents the plurality of objective functions for each of a plurality of attributes, where d is a partial distance value representing a comparison between objects and where $f_i=0$ if the two objects do not share the attribute i.

In step 316, a similarity function (also called a radius function, a neighborhood function or a fuzzy membership function) is defined. In step 318, the control flow of FIG. 3 ceases. A similarity function defines a similarity value representing the distance between two objects, based on the general objective function $f_G$. The similarity function can be used to capture all objects matching the sample object by capturing all objects having a similarity value above a certain threshold. For example, a similarity value n can be defined as a function of d (a distance value representing a comparison between objects, defined by $f_G$ above), as:

$$n = 1 - d^2/(d^2+1)$$

The above function shows that as distance between objects (d) approaches zero, the similarity value n approaches one. Conversely, as the distance between objects (d) approaches infinity, the similarity value n approaches zero. Thus, objects that match perfectly would produce a similarity value n of one or close to one. Accordingly, objects that differ greatly would produce a similarity value n of zero or close to zero.

Figure 4:
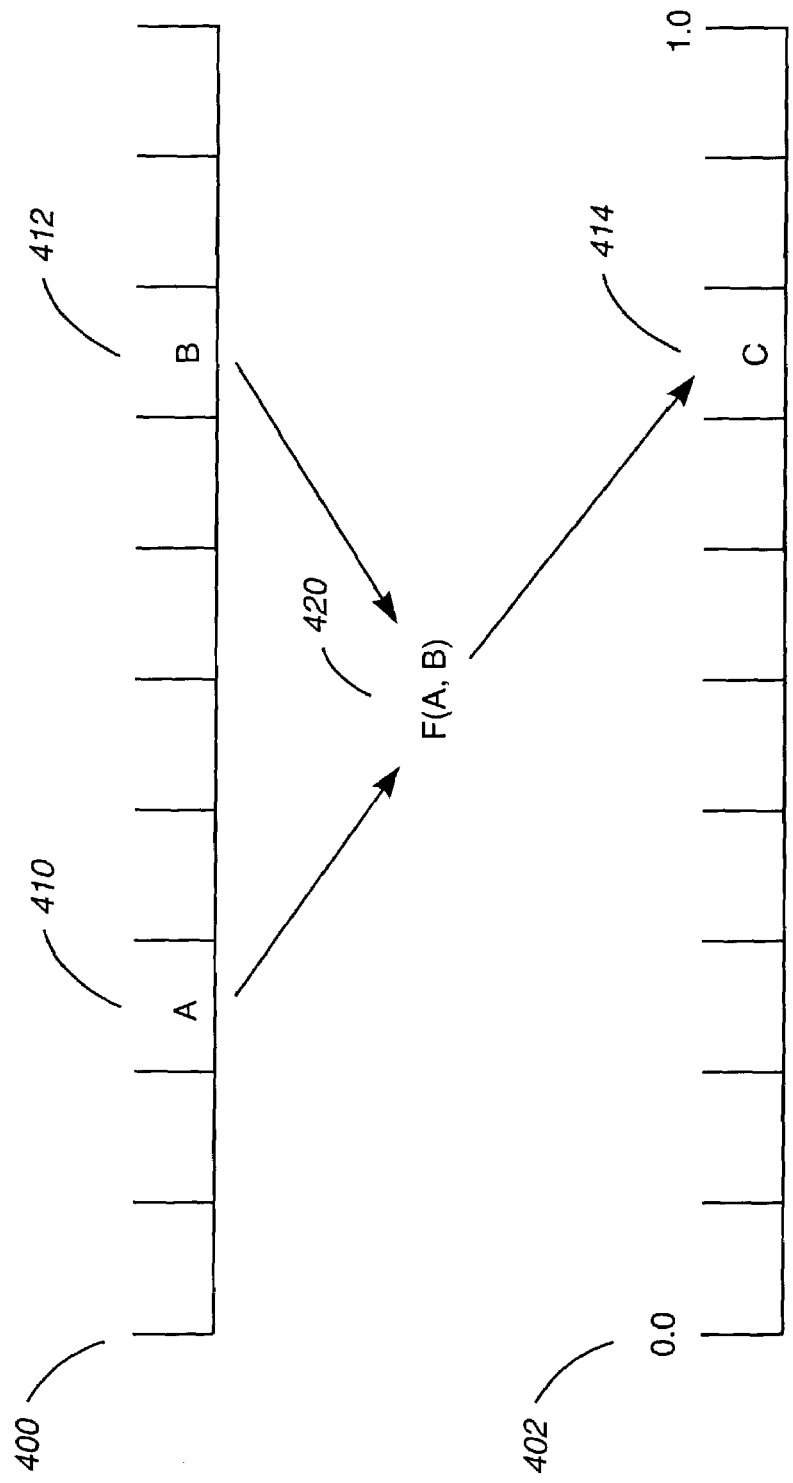
FIG. 4 is an illustration of a value mapping according to a preferred embodiment of the present invention.

In order to represent the similarity function $f_S$ above in terms of the general objective function $f_G$ defined above, we substitute general objective function $f_G$ for d, producing a similarity function $f_S$ defined as:

$$n = f_S(f_G)$$

where $f_S$ satisfies the following criteria: 1) its domain is [0,1]; 2) it is a monotonic function: if $d_1 < d_2$, then $f_S(d_1) \geq f_S(d_2)$; 3) if two objects have distance as zero, we will have: $f_S(0)=1$; and 4) there exists a number of $d_m$, such that $f_S(d_m)=0.5$ FIG. 4 is an illustration of a value mapping according to a preferred embodiment of the present invention. The value mapping of FIG. 4 describes in more detail the definition of an objective function for each ordering system, as described in step 310 of FIG. 3 above. An objective function f is defined as a mapping of two values from an ordering system to a single non-negative number. Mathematically, an objective function is a map between a pair of values from a value space and a non-negative real number. In practice, the objective function defines a difference, or a distance, between two values in a value space.

FIG. 4 shows a value space 400 representing a value space of an attribute of an object in database 103. FIG. 4 also shows a value space 402 representing a normalized value space (or domain) of a normalized objective function of an ordering system of an attribute. Two values are shown in the value space 400: value A, 410, and value B, 412. An objective function f 420 is shown, defining a mapping of two values from value space 400 to a single non-negative number in the value space 402. Objective function f 420 maps value A, 410, and value B, 412 from value space 400 to value C, 414, in value space 402.

In one example (using the real estate database example above), the value space 400 represents the distance between a home and a potential homebuyer's work. The normalized value space 402, correctly ranges from zero to one. In the value space 402, zero indicates high similarity or high correspondence, while one indicates high dissimilarity or incongruence. In this example, value A, 410, is less than value B, 412.

The objective function f is defined as:

$$f = (B-A)/D$$

where D represents the maximum distance that is possible between two points (in the area the home buyer is searching for a home). Thus, the equation above shows that if both A and B are the same or similar distance from the home, then the resultant value of f is zero, indicating high similarity or high correspondence. On the other hand, the equation above shows that if the distance between A and B is the maximum distance possible (D), then the resultant value of f is one, indicating high dissimilarity or incongruence.

III. Exemplary Implementations

The present invention can be realized in hardware, software, or a combination of hardware and software in computer 101 or the computer system of database 103 of FIG. 1A. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product (in computer 101 or the computer system of database 103), which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 5:
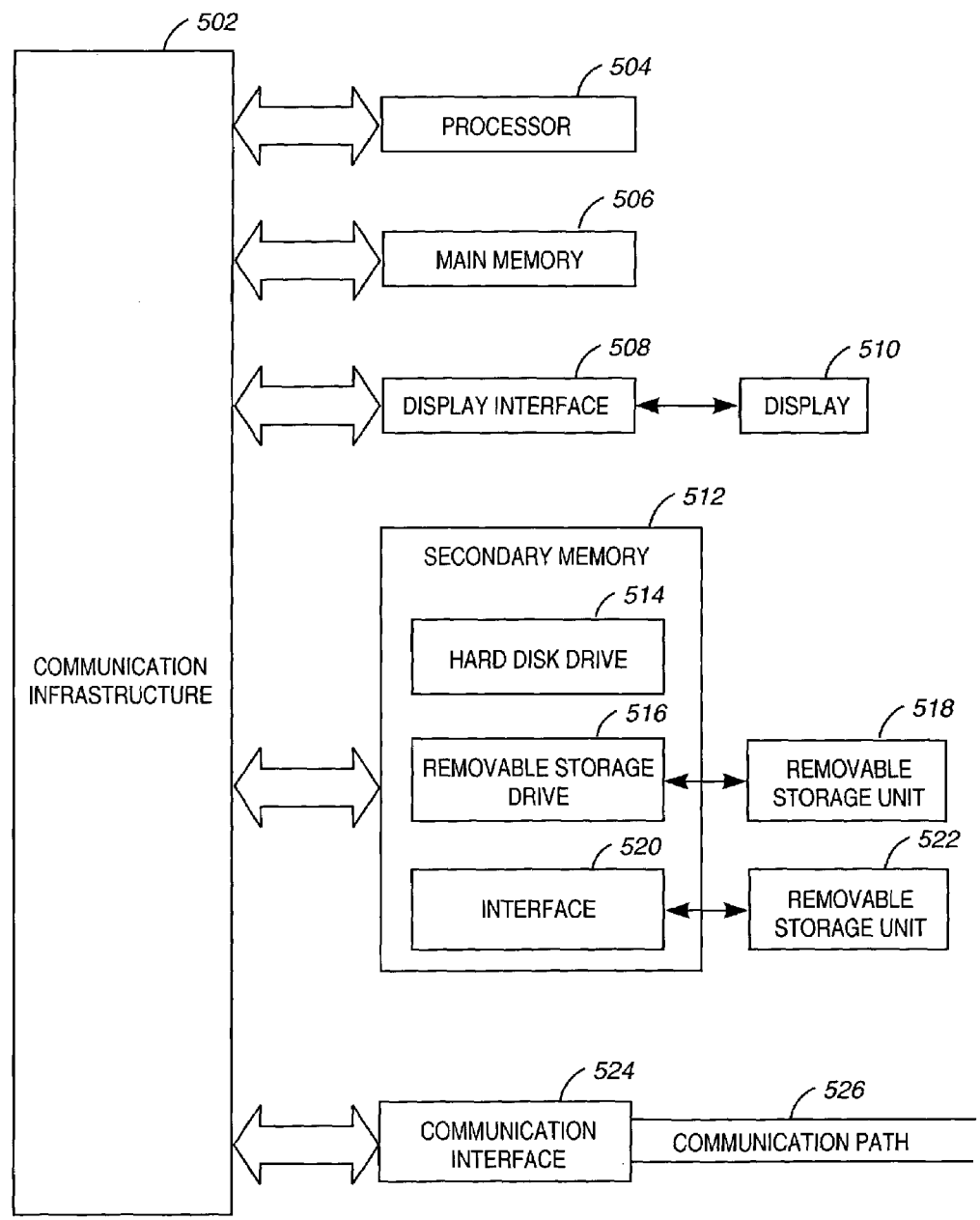
FIG. 5 is a block diagram of a computer system useful for implementing a preferred embodiment of the present invention.

FIG. 5 is a block diagram of a computer system useful for implementing an embodiment of the present invention. The computer system of FIG. 5 is a more detailed representation of the computer 101 or the computer system of database 103. The computer system of FIG. 5 includes one or more processors, such as processor 504. The processor 504 is connected to a communication infrastructure 502 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 508 that forwards graphics, text, and other data from the communication infrastructure 502 (or from a frame buffer not shown) for display on the display unit 510. The computer system also includes a main memory 506, preferably random access memory (RAM), and may also include a secondary memory 512. The secondary memory 512 may include, for example, a hard disk drive 514 and/or a removable storage drive 516, representing a floppy disk drive, a magnetic tape drive, an optical disk drive, etc. The removable storage drive 516 reads from and/or writes to a removable storage unit 518 in a manner well known to those having ordinary skill in the art. Removable storage unit 518, represents a floppy disk, magnetic tape, optical disk, etc. which is read by and written to by removable storage drive 516. As will be appreciated, the removable storage unit 518 includes a computer usable storage medium having stored therein computer software and/or data.

In alternative embodiments, the secondary memory 512 may include other similar means for allowing computer programs or other instructions to be loaded into the computer system. Such means may include, for example, a removable storage unit 522 and an interface 520. Examples of such may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to the computer system.

The computer system may also include a communications interface 524. Communications interface 524 allows software and data to be transferred between the computer system and external devices. Examples of communications interface 524 may include a modem, a network interface (such as an Ethernet card), a communications port, a PCM-CIA slot and card, etc. Software and data transferred via communications interface 524 are in the form of signals which may be, for example, electronic, electromagnetic, optical, or other signals capable of being received by communications interface 524. These signals are provided to communications interface 524 via a communications path (i.e., channel) 526. This channel 526 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 506 and secondary memory 512, removable storage drive 516, a hard disk installed in hard disk drive 514, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 506 and/or secondary memory 512. Computer programs may also be received via communications interface 524. Such computer programs, when executed, enable the computer system to perform the features of the present invention as discussed herein. In particular, the computer programs, when executed, enable the processor 504 to perform the features of the computer system. Accordingly, such computer programs represent controllers of the computer system.

IV. Conclusion

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for comparing objects, each object having multiple attributes, comprising:

selecting a plurality of attributes common to objects being compared, wherein different objects being compared can have different attributes relative to each other;

defining at least one value space for each attribute of the "plurality of attributes selected, wherein the at least one value space specifies the possible values that each attribute can take, and wherein each selected attribute associated with an object being compared can have a value space that is different from a value space of the same attribute associated with a different object being compared;

defining a plurality of ordering systems, wherein an ordering system is defined for each value space of the at least one value space, and wherein the defining of an ordering system for a value space comprises selecting whether the value space consists of non-ordered values, partially ordered values, or fully ordered values;

defining a plurality of objective functions, wherein an objective function is defined for each ordering system of the plurality of ordering systems and wherein an objective function maps a pair of values of a value space to a number value that defines a difference, or a distance, between the pair of values in the value space;

normalizing each objective function of the plurality of objective functions, and wherein each normalized objective function maps a difference of two values in a first value space to a single non-negative number in a range from 0 to 1; and defining a mapping from the plurality of normalized objective functions to a general objective function, wherein a result of an execution of the mapping from the plurality of normalized objective functions to the general objective function is a distance value representing a comparison between objects, and wherein such distance value is a non-negative value, and further wherein such general objective function is a convex function.

2. The method of claim 1, wherein a value space comprises at least one of:
an ASCII or Unicode string;
a real number;
an integer; and
a natural number.

3. The method of claim 2, wherein an ordering system comprises a system for comparing values in a value space that includes partially ordered values.

4. The method of claim 3, wherein an objective function maps a pair of values of a value space to a non-negative real number, and wherein the objective function is not symmetrical.

5. The method of claim 1, wherein the mapping from the plurality of objective functions to a general objective function is defined as:

$$d = \alpha_1 f_1 + \alpha_2 f_2 + \ldots + \alpha_n f_n$$

where d is the distance value representing a comparison between objects,
$f_1, f_2, \ldots, f_n$, are the plurality of objective functions,
$\alpha_1, \alpha_2, \ldots, \alpha_n \geq 0$ and $\alpha_1 + \alpha_2 + \ldots + \alpha_n = 1$.

6. The method of claim 5, further comprising:
defining a similarity value n representing a comparison between two objects, wherein the similarity value n is defined as:

$$n = 1 - d^2/(d^2 + 1).$$

7. The method of claim 1, wherein the mapping from the plurality of objective functions to a general objective function is defined as:

$$d = f_1^2 + f_2^2 + \ldots + f_n^2$$

where d is the distance value representing a comparison between objects, and
$f_1, f_2, \ldots, f_n$ are the plurality of objective functions.

8. The method of claim 1, further comprising:
selecting a first object and a second object; and
executing the mapping using the attributes of the first object and the second object, wherein the distance value generated from the execution of the mapping represents a comparison of the first object and the second object.

9. A computer readable medium including computer instructions for comparing objects, each object having multiple attributes, the computer instructions including instructions for:
selecting a plurality of attributes common to objects being compared, wherein different objects being compared can have different attributes relative to each other;
defining at least one value for each attribute of the plurality of attributes selected, wherein the at least one value space specifies the possible values that each attribute can take, and wherein each selected attribute associated with an object being compared can have a value space that is different from a value space of the same attribute associated with a different object being compared;
defining a plurality of ordering systems, wherein an ordering system is defined for each value space of the at least one value space, and wherein the defining of an ordering system for a value space comprises selecting whether the value space consists of non-ordered values, partially ordered values, or fully ordered values
defining a plurality of objective functions, wherein an objective function is defined for each ordering system of the plurality of ordering systems and wherein an objective function maps a pair of values of a value space to a number value that defines a difference, or a distance, between the pair of values in the value space;
normalizing each objective function of the plurality of objective functions, and wherein each normalized objective function maps a difference of two values in a first value space to a single non-negative number in a range from 0 to 1 and
defining a mapping from the plurality of normalized objective functions to a general objective function, wherein a result of an execution of the mapping from the plurality of normalized objective functions to the general objective function is a distance value representing a comparison between objects, and wherein such distance value is a non-negative value, and further wherein such general objective function is a convex function.

10. The computer readable medium of claim 9, wherein a value space comprises at least one of:
an ASCII or Unicode string;
a real number
an integer; and
a natural number.

11. The computer readable medium of claim 10, wherein an ordering system comprises a system for comparing values in a value space that includes partially ordered values.

12. The computer readable medium of claim 11, wherein an objective function maps a pair of values of a value range to a non-negative real number and wherein the objective function is not symmetrical.

13. The computer readable medium of claim 9, wherein the mapping from the plurality of objective functions to a general objective function is defined as:

$$d = \alpha_1 f_1 + \alpha_2 f_2 + \ldots + \alpha_n f_n$$

where d is the distance value representing a comparison between objects,
$f_1, f_2, \ldots, f_n$ are the plurality of objective functions,
$\alpha_1, \alpha_2, \ldots, \alpha_n \geq 0$ and $\alpha_1 + \alpha_2 + \ldots + \alpha_n = 1$.

14. The computer readable medium of claim 13, further comprising computer instructions for:
defining a similarity value n representing a comparison between two objects, wherein the similarity value n is defined as:

$$n = 1 - d^2/(d^2 + 1).$$

15. The computer readable medium of claim 9, wherein the mapping from the plurality of objective functions to a general objective function is defined as:

$$d = f_1^2 + f_2^2 + \ldots + f_n^2$$

where d is the distance value representing a comparison between objects, and
$f_1, f_2, \ldots, f_n$ are the plurality of objective functions.

16. The computer readable medium of claim 9, further comprising computer instructions for:
selecting a first object and a second object; and
executing the mapping using the attributes of the first object and the second object, wherein the distance value generated from the execution of the mapping represents a comparison of the first object and the second object.

17. A computer system comprising:
a memory for storing a database comprising objects, each object having multiple attributes; and
a processor, communicatively coupled to the memory, for:

selecting a plurality of attributes common to objects being compared, wherein different objects being compared can have different attributes relative to each other;

defining at least one value space for each attribute of the plurality of attributes selected, wherein the at least one value space specifies the possible values that each attribute can take, and wherein each selected attribute associated with an object being compared can have a value space that is different from a value space of the same attribute associated with a different object being compared;

defining a plurality of ordering systems, wherein an ordering system is defined for each value space of the at least one value space, and wherein the defining of an ordering system for a value space comprises selecting whether the value space consists of non-ordered values, partially ordered values, or fully ordered values defining a plurality of objective functions, wherein an objective function is defined for each ordering system of the plurality of ordering systems and wherein an objective function maps a pair of values of a value space to a number value that defines a difference, or a distance, between the pair of values in the value space;

normalizing each objective function of the plurality of objective functions, and wherein each normalized objective function maps a difference of two values in a first value space to a single non-negative number in a range from 0 to 1 and defining a mapping from the plurality of normalized objective functions to a general objective function, wherein a result of an execution of the mapping from the plurality of normalized objective functions to the general objective function is a distance value representing a comparison between objects, and wherein such distance value is a non-negative value, and further wherein such general objective function is a convex function.

18. The computer system of claim 17, wherein the processor for further:

selecting a first object and a second object; and executing the mapping using the attributes of the first object and the second object, wherein the distance value generated from the execution of the mapping represents a comparison of the first object and the second object.

* * * * *